US008966274B2

(12) United States Patent
Ram

(10) Patent No.: US 8,966,274 B2
(45) Date of Patent: Feb. 24, 2015

(54) FILE TAMPER DETECTION

(71) Applicant: CA, Inc., Islandia, NY (US)

(72) Inventor: Jaimini Ram, Bangalore (IN)

(73) Assignee: CA, Inc., Islandia, NY (US)

(\*) Notice: Subject to any disclaimer, the term of this patent is extended or adjusted under 35 U.S.C. 154(b) by 12 days.

(21) Appl. No.: 13/725,815

(22) Filed: Dec. 21, 2012

(65) Prior Publication Data

US 2014/0181528 A1    Jun. 26, 2014

(51) Int. Cl.
*G06F 21/00* (2013.01)
*G06F 21/64* (2013.01)
*H04L 9/32* (2006.01)

(52) U.S. Cl.
CPC ............... *G06F 21/64* (2013.01); *H04L 9/3247* (2013.01)
USPC ........... 713/176; 713/177; 713/178; 713/179; 705/75

(58) Field of Classification Search
USPC .............................................. 705/75; 713/176
See application file for complete search history.

(56) References Cited

U.S. PATENT DOCUMENTS

2006/0282676 A1\* 12/2006 Serret-Avila et al. ......... 713/176
2010/0131770 A1\*  5/2010 Torrubia et al. .............. 713/176

\* cited by examiner

*Primary Examiner* — Ghzal Shehni
(74) *Attorney, Agent, or Firm* — Schwegman Lundberg & Woessner, P.A.

(57) ABSTRACT

This disclosure relates generally to methods and systems for determining when a file has changed. According to one aspect of the present disclosure, a method of determining if contents of a file have changed can include determining if a digital signature created as a function of contents of the file has changed, and when the digital signature has changed, overlaying the contents of the file with a first mark that indicates the contents have changed and blocks a view of the contents of the file.

16 Claims, 5 Drawing Sheets

FILE TAMPER DETECTION

BACKGROUND

Including a digital signature in a document may help provide document integrity. When the digital signature has changed in a portable data format document, an "X" can be placed over the digital signature block. Such a solution may require the user to actively look for the signature block to determine if the signature is valid.

BRIEF SUMMARY

According to one aspect of the present disclosure, a method of determining if contents of a file have changed can include determining if a digital signature created as a function of contents of the file has changed, and when the digital signature has changed, overlaying the contents of the file with a first mark that indicates the contents have changed and blocks a view of the contents of the file.

According to another aspect of the present disclosure, a system for determining if contents of a file have changed can include a digest module configured to create a digital signature as a function of the contents of a file, a comparator module configured to compare the digital signature with another digital signature, determine if the digital signatures are the same, and produce a binary indicator configured to indicate if the digital signatures are the same or different, and a watermark module configured to obscure the contents of the document with a mark indicates the contents of the file have changed when the binary indicator indicates that the digital signatures are different.

According to yet another aspect of the present disclosure, a computer readable storage medium includes computer readable program code embodied therewith. The computer program code includes computer readable program code to determine if contents of a file have changed and can include computer readable program code configured to create a unique digital signature as a function of the contents of the file, associate the digital signature with the file, determine if the digital signature has changed, and when the digital signature has changed, overlay the contents of the document with a blank layer and a mark that indicates the contents have changed.

BRIEF DESCRIPTION OF THE DRAWINGS

Aspects of the present disclosure are illustrated by way of example and are not limited by the accompanying FIGS. with like references indicating like elements.

FIG. 1 illustrates a block diagram of an example of a system for determining if a file has been tampered with.

FIG. 2 illustrates a flow diagram of an example of a technique for determining if a file has been tampered with.

FIG. 3 illustrates a flow diagram an example of an algorithm for determining if a file has been tampered with.

DETAILED DESCRIPTION

Figure 1:
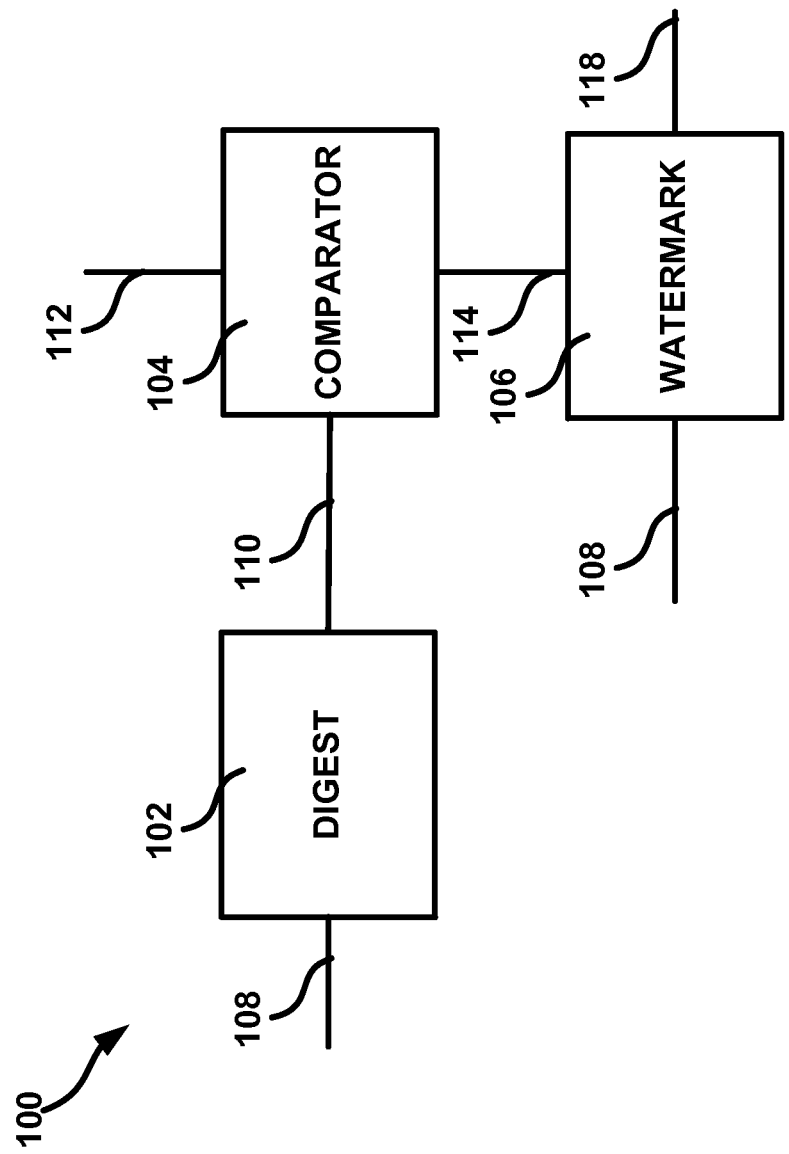

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Digital signatures in files can provide document integrity by helping to ensure that if the content of the file changes then the digital signature can be determined to be invalid. When the contents of the document have been changed, the contents of the file may still be visible. In one or more examples, the document may still be printed even though the digital signature was deemed invalid. In such examples, the file can be printed without the digital signature block, thus, at least partially, enabling document fraud.

Another solution can include embedding a script into the file, or otherwise using a script not embedded in the file. The script can check the validity of a digital signature of the file. If the digital signature is valid, then the file contents can be shown along with a configurable overlay (e.g., watermark or mark) that indicates that the digital signature is valid. If the script determines that the watermark is invalid, then the file contents can be obscured or not shown. In such a case, a configurable watermark can be shown that indicates that the digital signature was determined to be invalid. To help ensure that the script cannot be removed from the file, the file can be password protected, such as by a random administrator password to protect against changes from user operations. The digitally signed and password protected file can be given to a user who can open the file and have the digital signature validated. The user can send the file to other recipients. When a recipient opens the file and the script determines the file is not tampered with, then the contents of the file can be displayed with a watermark that indicates that the digital signature is valid. When a recipient opens the file and the script determines the file is tampered with, then the contents of the file can be obscured or hidden by a mark (e.g., a watermark) that indicates that the digital signature is invalid. An advantage of such a solution can include improving user awareness of the validity of the file. Another advantage of such a solution can include rendering the contents of the file indiscernible or unprintable if it is determined that the digital signature is invalid.

Referring now to FIG. 1, a system 100 for determining if a file has been tampered with can include a digest module 102, a comparator module 104, or a watermark module 106.

The digest module 102 can be configured to include an input 108 and an output 110. The digest module 102 can receive the input 108 and create a digital signature as a function of the input 108. The digest module 102 can be incorporated into a script that is embedded in the file or can be separate from the file. The digital signature created by the digest module 102 can be substantially unique to the input 108 received, such that given different inputs it is very probable that the same digital signature would not be created as function of the different inputs. The digital signature can be created using a cryptographic hash algorithm, such as an MD4, MD5, SHA-1, or SHA-2 algorithm. The input 108 can be contents of a file, such as the entire contents of the file or a portion of the contents of the file. The input 108 can include data (e.g., the contents of the file) or metadata (e.g., data about the contents of the file). Metadata can include size of the file, author, creation date, date of last modification, summary of the contents, type of file (e.g., a Microsoft Word® document (".doc"), portable data format document (".pdf"), an application (".exe"), or other file type), or other file metadata.

The comparator 104 can be configured to receive the output 110 of the digest module 102 and compare the output 110 to data received at input 112. The input 112 can be a digital signature associated with the file that was determined at an earlier time and associated with the file. The input 112 may be stored in or saved in and retrieved from a container of the file, such as a Public Key Infrastructure (PKI) container or other digital signature container. The input 112 may be stored in a location external to the file, such as in another file, and retrieved from the location of that other file. The comparator module 104 can compare the two digital signatures and produce an indicator 114 (e.g., a binary indicator) that indicates whether the digital signatures are the same or different. For example, the comparator 104 can compare a digital signature from the digest module 102 to a digital signature that was previously created or retrieved. Such a comparison can determine whether the file has changed since the previously created digital signature was created.

Figure 4:
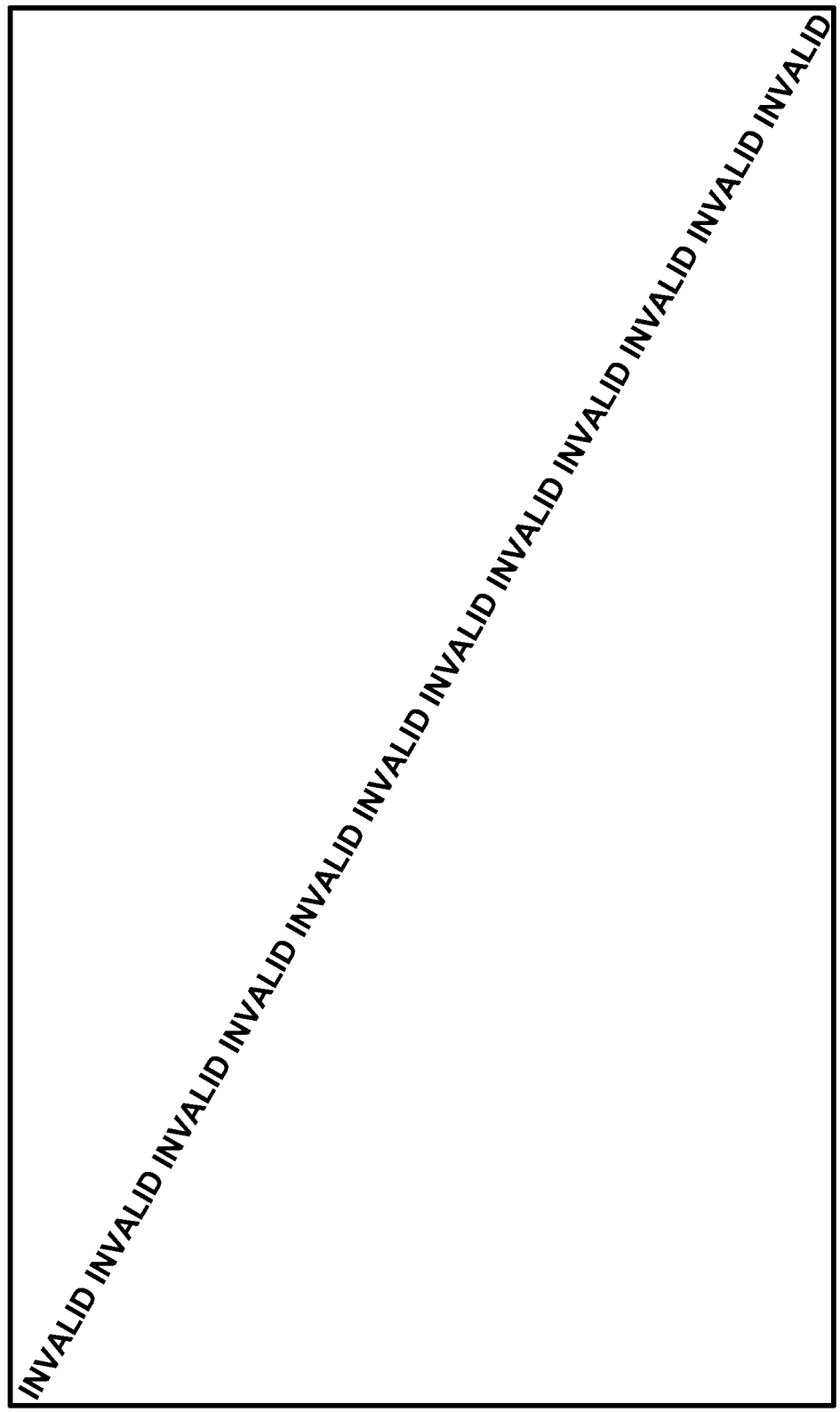
FIG. 4 illustrates an example of a file that has had its contents overlaid with a blank layer and a mark that indicates an invalid digital signature was determined.

The watermark module 106 can be configured to receive the indicator 114 and the input 108 and produce a modified input as its output 118. The output 118 can be created as a function of the indicator 114, such as a binary indicator 114 that indicates whether the digital signatures input into the watermark module 106 are the same or different. When the indicator 114 indicates that the digital signatures are different, the watermark module 106 can overlay the contents of the file (e.g., received at input 108) with a blank/colored layer or a mark (e.g., a visible mark) that indicates that the signatures are different. An example of a file that has had its contents covered with a blank layer (e.g., a layer that includes no text or is a solid color such as white) and a mark is shown in FIG. 4. Such a mark can block the contents of the file from being viewed. When the indicator 114 indicates that the digital signatures are the same, the watermark module 106 can underlay the contents of the file with a mark that indicates that the signatures are different, overlay the contents of the file with a watermark (e.g., a visible watermark), or do nothing, such as to leave the contents of the file unobscured or visible. As used herein, underlaying the contents of a file with a mark means putting a mark on a layer underneath the contents of the file. Overlaying or underlaying the contents of the file with a mark (e.g., a watermark, a layer and a mark/watermark) can include selecting an overlay from one or more overlays present in a file and showing that overlay at the appropriate layer.

The watermark module 106 can be configured to overlay the contents of the file with a mark that indicates that an application used to open the file must be configured to verify the digital signature. Such a mark can indicate that the application must support scripting or must support scripting in a specific language in order to view the contents of the file. Such a configuration can help guarantee that the digital signature is verified before the contents of the file are viewed.

Figure 2:
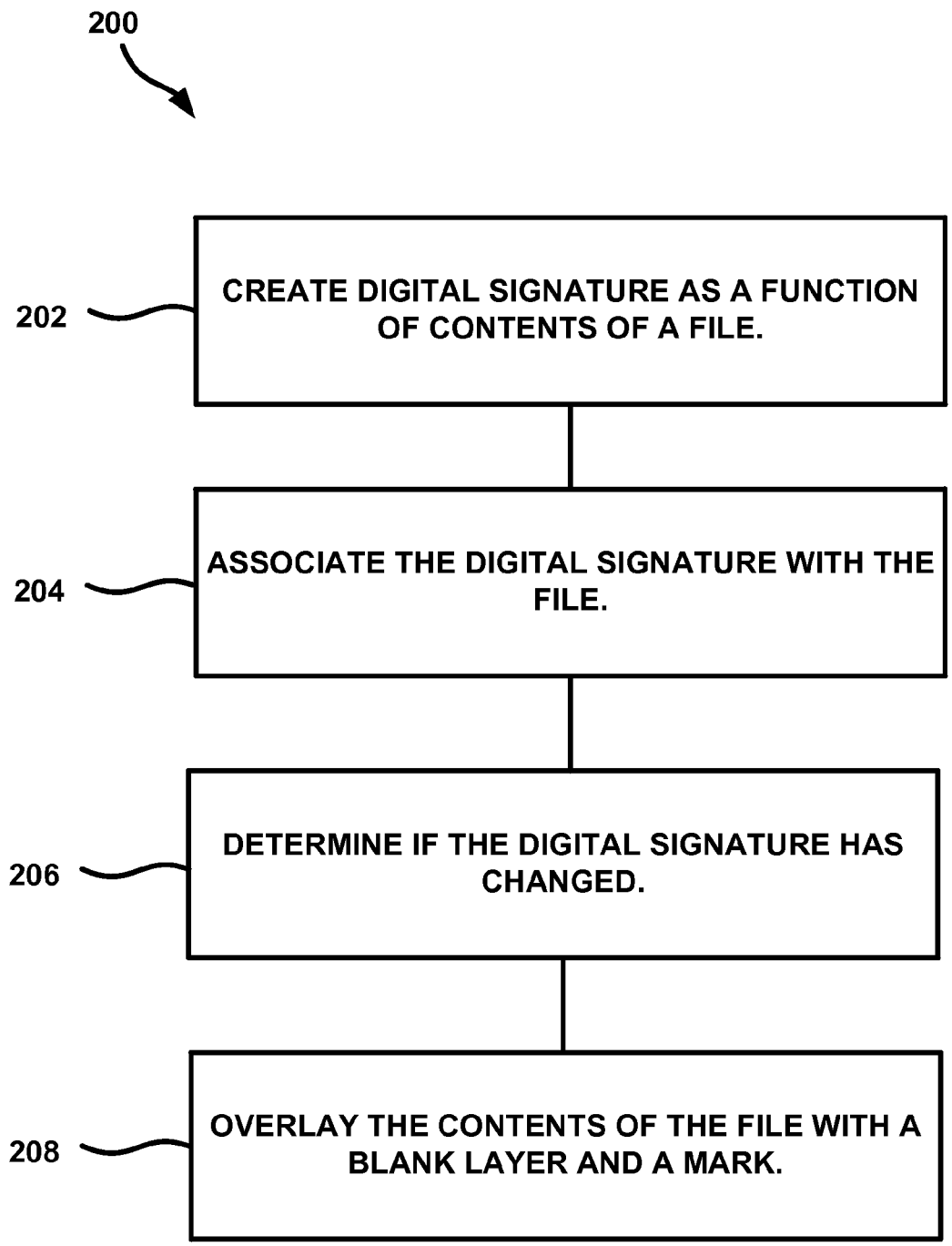

FIG. 2 shows an example of a technique 200 for determining if a file has been tampered with (e.g., the contents of the file have changed). At 202, a digital signature can be created as a function of contents of a file, such as by using digest module 102. At 204, the digital signature can be associated with the file. Such association can include saving the digital signature in a container of the file, such as a PKI container. At 206, it can be determined if the digital signature has changed, such as by comparing the digital signature to another digital signature that was generated previously for the file, such as by using the comparator 104. At 208, the contents of the file can be overlaid with a blank layer and a mark. The overlaying can be accomplished using the watermark module 106.

Figure 3:
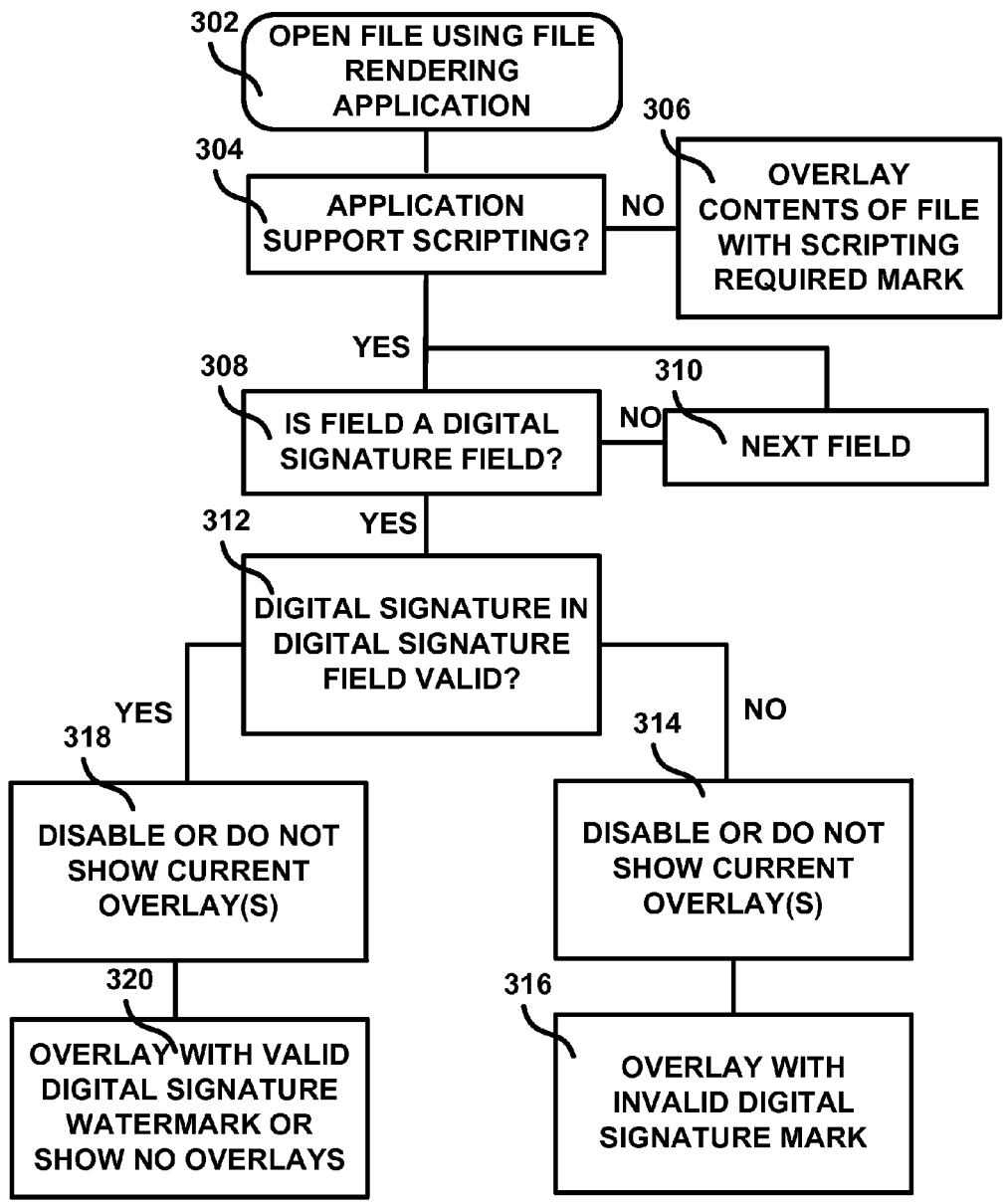

FIG. 3 is a flow chart of an example of an algorithm that can be used to determine if a file has been tampered with. At 302, a file can be opened using a file rendering application. At 304, it can be determined if the file rendering application supports scripting. At 306, when the application does not support scripting the contents of the file can be overlaid with a mark that indicates that a file rendering application that allows scripting must be used (e.g., is required) to open the file. At 308, when the rendering application does support scripting, the fields of the file are scanned and it is determined if the field is a signature field. At 310, when it is determined that the field is not a signature field the next field is scanned. At 312, when it is determined that the field is a digital signature field it is determined if the digital signature is valid, such as by using comparator 104. When no signature field is detected in the file then the current overlay that is shown can remain shown. At 314, when it is determined that the digital signature is not valid the current overlay(s) of the file are disabled or not shown unless the current overlay(s) are an invalid digital signature mark.

At 316, the contents of the file can be overlaid with the invalid digital signature watermark, such as by overlaying the contents of the file with a blank layer and a mark indicating that the signatures are invalid, such as by using the watermark module 106. At 318, when the digital signature is determined to be valid, the current overlay(s) are disabled or not shown unless the current overlay(s) are a valid digital signature mark. At 320, the contents of the file can be overlaid or underlaid with a valid digital signature mark (e.g., watermark) to indicate that the digital signatures are valid or all overlays can be disabled to indicate the same. When the creator of a file decides they want to change something in the file that includes a digital signature, they can discard the file, create a new file with the changes, and then resign the document.

FIG. 4 shows an example of a file that has had its contents covered with a blank layer and a mark, such as by using the watermark module 106.

Figure 5:
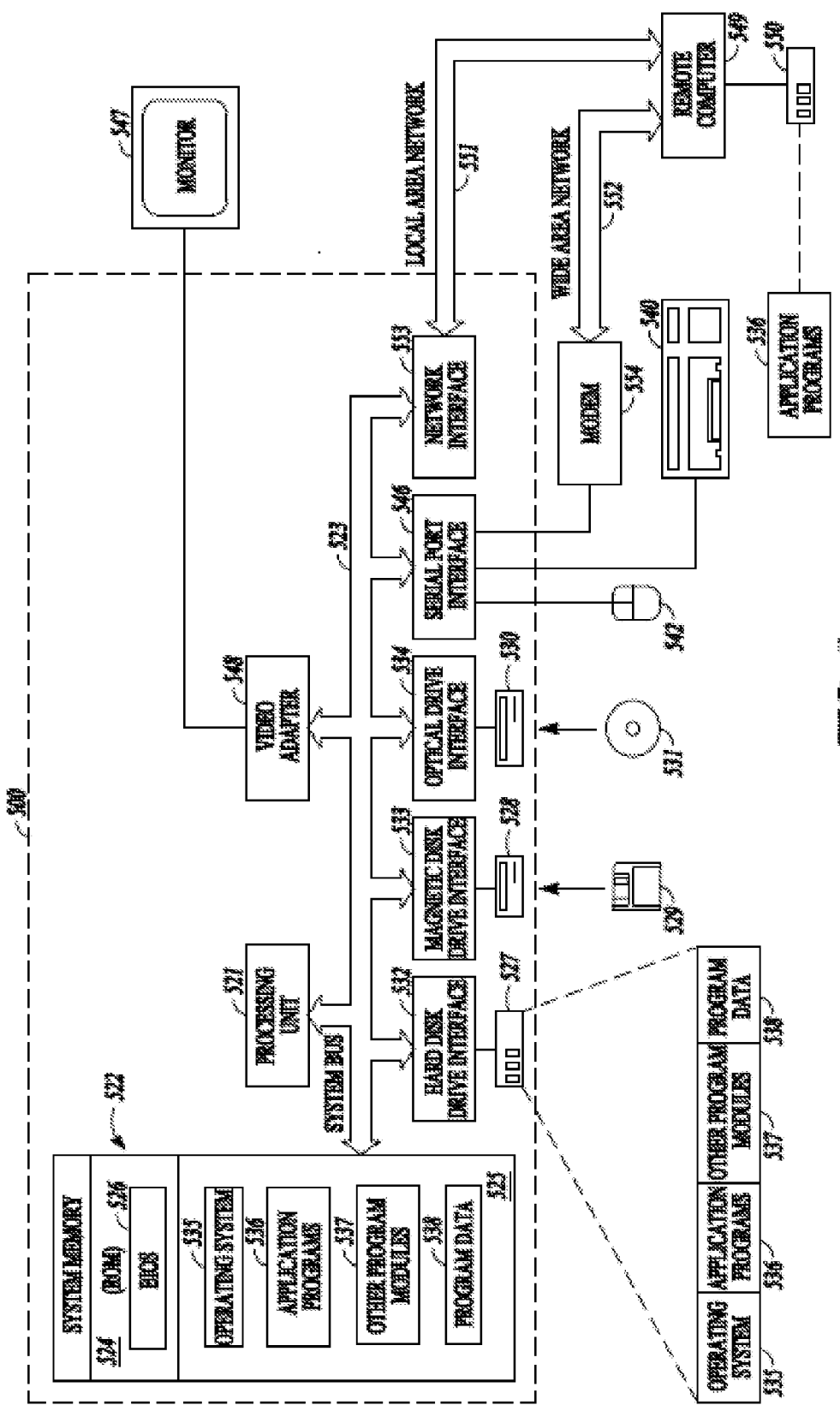
FIG. 5 illustrates an example of a computer system to implement techniques.

FIG. 5 shows a block diagram of an example of a computer system to implement techniques, according to an example embodiment. In the embodiment shown in FIG. 5, a hardware and operating environment is provided that is applicable to any of the servers and/or remote clients shown in the other FIGS.

As shown in FIG. 5, one embodiment of the hardware and operating environment includes a general purpose computing device in the form of a computer 500 (e.g., a personal computer, workstation, or server), including one or more processing units 521, a system memory 522, and a system bus 525 that operatively couples various system components including the system memory 522 to the processing unit 521. There can be only one or there can be more than one processing unit 521, such that the processor of computer 500 comprises a single CPU, or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, can be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein can be resident on any one or number of these computer-readable media.

A user can enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 can operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide-area network 552, such as the internet. The modem 554, which can be internal or external, is connected to the system bus 523 via the serial port interface 546. In a networked environment, program modules depicted relative to the computer 500 can be stored in the remote memory storage device 550 of remote computer 549. It is appreciated that the network connections shown are exemplary and other means of, and communications devices for, establishing a communications link between the computers can be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

ADDITIONAL NOTES AND EXAMPLES

In Example 1, a method of determining if contents of a file have changed includes determining if a digital signature created as a function of contents of the file has changed.

In Example 2, the method of Example 1 includes, when the digital signature has changed, overlaying the contents of the file with a first mark that (1) indicates the contents have changed and (2) blocks a view of the contents of the file.

In Example 3, the method of at least one of Examples 1-2 includes, when the digital signature has not changed, underlaying the contents of the file with a second mark that (1) indicates the contents have not changed and (2) allows the contents of the file to be viewed.

In Example 4, the of at least one of Examples 1-3 includes, before determining if a digital signature created as a function of contents of the file has changed, associating the digital signature with the file.

In Example 5, the method of at least one of Examples 1-4 includes creating an overlay on the file indicating that an application configured to verify the digital signature is required to view the file.

In Example 6, creating a unique digital signature as a function of the contents of the file of at least one of Examples 1-5 includes creating a unique digital signature as a function of the contents of a portable document format file.

In Example 7, creating the overlay on the file indicating that the application configured to verify the digital signature is required to view the file of at least one of Examples 1-6 includes creating an overlay that indicates that the application is required to support scripting.

In Example 8, the method of at least one of Examples 1-7 includes when the digital signature has not changed, underlaying the contents of the file with a mark that indicates the contents have not changed.

In Example 9, associating the digital signature with the file of at least one of Examples 1-8 includes saving the digital signature in a container of the file.

In Example 10, saving the digital signature in a container of at least one of Examples 1-9 includes saving the digital signature in a public key infrastructure container of the file.

In Example 11, creating the unique digital signature as a function of the contents of the file of at least one of Examples 1-10 includes creating a cryptographic hash signature as a function of the contents of the file.

In Example 12, a system includes a digest module configured to create a digital signature as a function of the contents of a file.

In Example 13, the system of at least one of Examples 1-12 includes a comparator module configured to compare the digital signature with another digital signature, determine if the digital signatures are the same, and produce a binary indicator configured to indicate if the digital signatures are the same or different.

In Example 14, the system of at least one of Examples 1-13 includes a watermark module configured to obscure the contents of the file with a mark indicates the contents of the file have changed when the binary indicator indicates that the digital signatures are different.

In Example 15, the watermark module of at least one of Examples 1-14 is configured to create an overlay on the file indicating that an application with a digest module is required to view the file.

In Example 16, the digest module of at least one of Examples 1-15 is configured to create a unique digital signature as a function of the contents of a portable document format file.

In Example 17, the watermark module of at least one of Examples 1-16 is configured to create an overlay on the portable document file that indicates that an application used to open the file must support scripting.

In Example 18, the watermark module of at least one of Examples 1-17 is configured to underlay the contents of the file with a mark that indicates the contents have not changed when the binary indicator indicates that the digital signatures are the same.

In Example 19, the digest module of at least one of Examples 1-18 is configured to implement a cryptographic hash function.

In Example 20, the computer of at least one of Examples 1-19 is configured to associate the digital signature created as a function of the contents of the file with the file by storing the digital signature in a container of the file.

In Example 21, the container of at least one of Examples 1-20 is a public key infrastructure container.

In Example 22 a computer program product includes a computer readable storage medium having computer readable program code embodied therewith, the computer program code including computer readable program code configured to create a unique digital signature as a function of the contents of the file.

In Example 23, the computer readable storage medium of at least one of Examples 1-22 includes computer readable program code configured to associate the digital signature with the file.

In Example 24, the computer readable storage medium of at least one of Examples 1-23 includes computer readable program code configured to determine if the digital signature has changed.

In Example 25, the computer readable storage medium of at least one of Examples 1-24 includes computer readable program code configured to, when the digital signature has changed, overlay the contents of the file with a blank layer and a mark that indicates the contents have changed.

In Example 26, the computer readable storage medium of at least one of Examples 1-25 includes computer readable program code configured to create an overlay on the file indicating that an application configured to verify the digital signature is required to view the file.

In Example 27, the program code configured to create a unique digital signature as a function of the contents of the file of at least one of Examples 1-26 includes program code configured to create a unique digital signature as a function of the contents of a portable document format file.

In Example 28, the program code configured to create the overlay on the file indicating that an application configured to verify the digital signature is required to view the file of at least one of Examples 1-27 includes program code configured to create an overlay that indicates that the application must support scripting.

In Example 29, the computer readable storage medium of at least one of Examples 1-28 includes computer readable program code configured to, when the digital signature has not changed, underlay the contents of the file with a mark that indicates the contents have not changed.

In Example 30, the program code configured to associate the digital signature with the file of at least one of Examples 1-29 includes program code configured to save the digital signature in a container of the file.

In Example 31, the program code configured to save the digital signature in a container of the file of at least one of Examples 1-30 includes program code configured to save the digital signature in a public key infrastructure container of the file.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer-implemented method of determining if contents of a file have changed comprising:
   determining, by a processor, if a digital signature created as a function of contents of the file has changed;
   when the digital signature has changed, overlaying, by the processor, the contents of the file with a first mark that (1) indicates the contents have changed and (2) blocks a view of the contents of the file; and
   when the digital signature has not changed, underlaying the contents of the file with a second mark that (1) indicates the contents have not changed and (2) allows the contents of the file to be viewed.

2. The method of claim 1, further comprising:
   overlaying the contents of the file with a mark that indicates that an application configured to determine if the digital signature has changed is required to view the file.

3. The method of claim 2, further comprising:
   creating a unique digital signature as a function of the contents of a portable document format file;
   and wherein overlaying the contents of the file with the mark that indicate that the application configured to determine if the digital signature has changed is required to view the file comprises overlaying the contents of the file with a mark that indicates that the application is required to support scripting.

4. The method of claim 3, further comprising:
   saving the digital signature in a container of the file.

5. The method of claim 4, wherein saving the digital signature in a container of the file comprises saving the digital signature in a public key infrastructure container of the file.

6. The method of claim 3, wherein creating the unique digital signature as a function of the contents of the file comprises creating a cryptographic hash signature as a function of the contents of the file.

7. A system comprising a hardware processor configured to implement:
- a digest software module configured to create a digital signature as a function of the contents of a file;
- a comparator software module configured to compare the digital signature with another digital signature, determine if the digital signatures are the same, and produce a binary indicator configured to indicate if the digital signatures are the same or different; and
- a watermark software module configured to:
  - obscure the contents of the file with a mark indicates the contents of the file have changed when the binary indicator indicates that the digital signatures are different; and
  - underlay the contents of the file with a mark that indicates the contents have not changed when the binary indicator indicates that the digital signatures are the same.

8. The system of claim 7, wherein the watermark software module is configured to create an overlay on the file indicating that an application with the digest software module is required to view the file.

9. The system of claim 8, wherein the digest software module is configured to create a unique digital signature as a function of the contents of a portable document format file; and
wherein the watermark software module is configured to create an overlay on the portable document file that indicates that an application used to open the file must support scripting.

10. The system of claim 7, wherein the digest software module is configured to implement a cryptographic hash function.

11. The system of claim 7, wherein the hardware processor is configured to associate the digital signature created as a function of the contents of the file with the file by storing the digital signature in a container of the file.

12. A computer program product comprising:
a non-transitory computer readable storage medium having computer readable program code embodied therewith, the computer program code comprising:
computer readable program code configured to:
- create a unique digital signature as a function of the contents of the file;
- associate the digital signature with the file;
- determine if the digital signature has changed; and
- when the digital signature has changed, overlay the contents of the file with a blank layer and a mark that indicates the contents have changed; and
- when the digital signature has not changed, underlay the contents of the file with a mark that indicates the contents have not changed.

13. The computer program product of claim 12, wherein the non-transitory computer readable storage medium further comprises computer readable program code configured to:
create an overlay on the file indicating that an application configured to verify the digital signature is required to view the file.

14. The computer program product of claim 13, wherein the program code configured to create a unique digital signature as a function of the contents of the file comprises program code configured to create a unique digital signature as a function of the contents of a portable document format file; and
the program code configured to create the overlay on the file indicating that an application configured to verify the digital signature is required to view the file comprises program code configured to create an overlay that indicates that the application must support scripting.

15. The computer program product of claim 12, wherein the program code configured to associate the digital signature with the file comprises program code configured to save the digital signature in a container of the file.

16. The computer program product of claim 12, wherein the program code configured to save the digital signature in a container of the file comprises program code configured to save the digital signature in a public key infrastructure container of the file.

* * * * *